Jan. 31, 1967   W. W. MALCOLM   3,301,571
QUICK ATTACHABLE AND DETACHABLE WHEEL MEANS FOR A BOAT
Filed Nov. 2, 1964
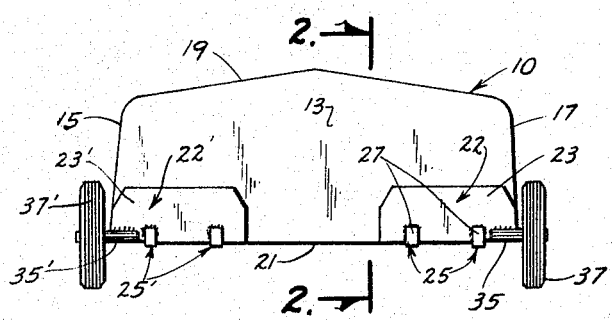
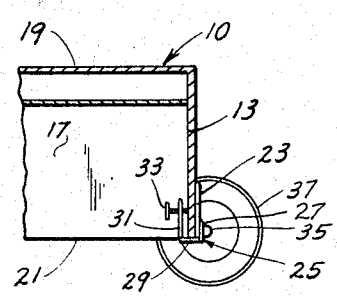
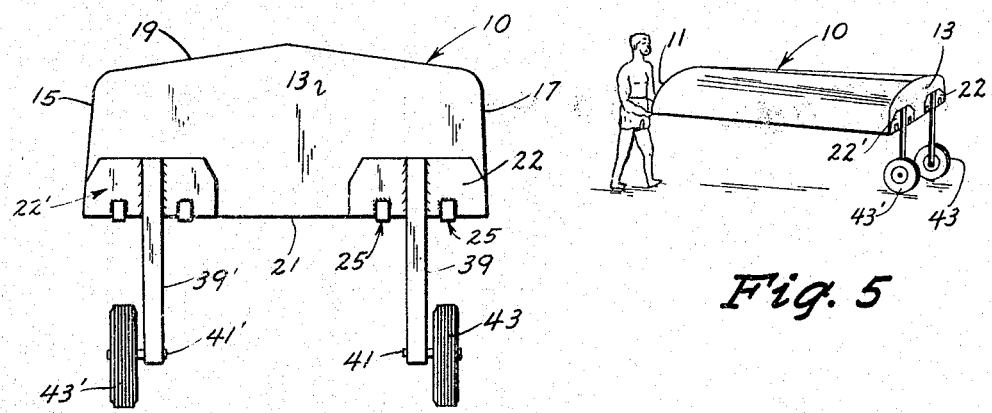
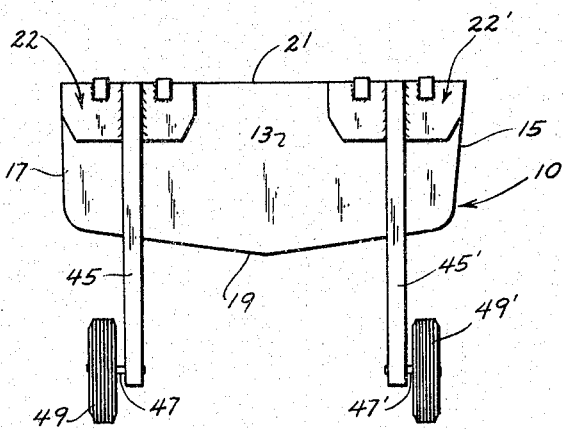
INVENTOR
WILLIAM W. MALCOLM
BY
Dick & Zarley
ATTORNEYS United States Patent Office 3,301,571
Patented Jan. 31, 1967

3,301,571
QUICK ATTACHABLE AND DETACHABLE
WHEEL MEANS FOR A BOAT
William W. Malcolm, Rte. 2, Box 187,
Montezuma, Iowa 50171
Filed Nov. 2, 1964, Ser. No. 407,960
1 Claim. (Cl. 280—47.32)

This invention relates to a wheel means for a boat and more particularly to a quick attachable and detachable wheel means for a boat.

Frequently, the boat must be carried or dragged from the vehicle or trailer to the water's edge if the trailer or vehicle cannot be brought within close proximity thereto due to the terrain, etc.

Therefore, it is a principal object of this invention to provide a quick attachable and detachable wheel means for a boat which eliminates the necessity of dragging or carrying the boat to the water's edge.

A further object of this invention is to provide a quick attachable and detachable wheel means for a boat which does not interfere with the normal operation of the boat if the wheel means are left thereon.

A further object of this invention is to provide a quick attachable and detachable wheel means for a boat which allows the boat to be transported by simply grasping one end of the boat and pushing or pulling thereon.

A further object of this invention is to provide a quick attachable and detachable wheel means for a boat which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is an end view of two wheel means detachably secured to the rear end of a boat;

FIG. 2 is a sectional view of the device seen in lines 2—2 of FIG. 1;

FIG. 3 is an end view of a modified form of the wheel means secured to the rearward end of a boat;

FIG. 4 is an end view of a still further modified form of the wheel means secured to the rearward end of a boat; and FIG. 5 is a perspective view illustrating the manner in which the wheel means seen in FIG. 3 are utilized.

The numeral 10 generally indicates a conventional boat having a forward end 11, rearward end 13, opposite sides 15 and 17, bottom 19 and top 21.

With respect to FIG. 1, the numeral 22 designates a detachable clamp assembly secured to the rearward end 13 of boat 10. Clamp assembly 22 includes a plate member 23 engaging the outer surface of rearward end 13 and which has secured thereto two brackets 25 each of which is comprised of a first vertical bracket member 27 which is secured to plate member 23 by means of welding or the like as seen in FIGS. 1 and 2. Vertical bracket member 27 terminates in a horizontal bracket member 29 extending forwardly therefrom. Horizontal bracket member 29 terminates in a vertical bracket member 31 extending upwardly therefrom as seen in FIG. 2 and threadably receives a clamping bolt means 33 extending therethrough and having its inner end engaging the inside surface of rearward end 13 to maintain clamp assembly 22 on boat 10 in the position seen in FIGS. 1 and 2.

The numeral 35 designates an axle member secured to the lower outside surface of plate 23 by means of welding or the like which extends horizontally outwardly therefrom. Rotatably mounted on the outer end of axle 35 is a wheel member 37. The numeral 22' designates a clamp assembly secured to rearward end 13 of boat 10 which is identical to clamp assembly 22. Clamp assembly 22 differs only from clamp assembly 21 in that axle member 35' extends horizontally outwardly in a direction opposite that to axle member 35. The component parts of clamp assembly 22', which are identical to the component parts of clamp assembly 22 are indicated by (').

With respect to FIG. 3, clamp assemblies 22 and 22' are mounted on the rearward end 13 of boat 10 in identical fashion to that illustrated in FIGS. 1 and 2. Secured to the outer surface of plate member 23 by means of welding or the like is an elongated bar member 39 extending vertically downwardly therefrom as seen in FIG. 3. An axle member 41 is secured to the lower end of bar member 39 by any convenient means and extends horizontally outwardly therefrom and has a wheel means 43 rotatably mounted on its outer end. Secured to the outside surface of plate member 23' is an elongated bar member 39' extending vertically downwardly therefrom. Secured to the lower end of bar member 39' by any convenient means is an axle member 41 extending horizontally outwardly therefrom which has a wheel member 43' rotatably mounted on its outer end.

With respect to FIG. 4, clamp assemblies 22 and 22' are mounted on rearward end 13 of boat 10 as illustrated in FIGS. 1 and 2. Secured to the outer surface of plate member 23 by means of welding or the like is an elongated bar member 45 extending vertically downwardly therefrom as viewed in FIG. 4. An axle member 47 is secured to the lower end of bar member 45 by any convenient means and has a wheel member 49 rotatably mounted on its outer end. An elongated bar member 45' is secured to the outer surface of plate member 23' and extends vertically downwardly therefrom as viewed in FIG. 4. An axle member 47' is secured to the lower end of bar member 45 by any convenient means and has a wheel member 49' rotatably mounted on its outer end. The modification seen in FIG. 4 differs from the modification seen in FIG. 3 in that bar members 45 and 45' extend in directions opposite to that of bar members 39 and 39'.

The normal method of operation is as follows. With respect to FIGS. 1 and 2, clamp assemblies 22 and 22' are mounted on rearward end 13 of boat 10 as previously described. When it is desired to transport the boat, the boat is simply placed in the inverted position as illustrated in FIGS. 1 and 2. A person simply grasps the bow or forward end 11 of the boat as seen in FIG. 5 and either pushes or pulls the boat to the desired destination with wheel members 37 and 37' rolling along the ground. When the boat has been delivered to its destination, clamp assemblies 22 and 22' may be removed from the boat if desired. If so desired, clamp assemblies 22 and 22' may be left on the boat and it can be appreciated that they will not interfere with the operation of the boat.

The device seen in FIGS. 3 and 5 is transported in identical fashion to that previously described. The only difference in the method of transportation is that the boat is suspended above the ground at a greater height than that possible with the device seen in FIGS. 1 and 2.

The modification in FIG. 4 is transported in similar fashion to that previously described with the exception that the boat is transported in an upright orientation rather than inverted.

It can be appreciated that the clamp assemblies 22 and 22' are quickly attachable and detachable. It can be appreciated that it is no longer necessary to carry or drag a boat but is simply necessary to move the boat in a fashion similar to that in which a wheelbarrow is pushed. Therefore, it can be seen that the device accomplishes at least all of its stated objectives.

Some changes may be made in the construction and arrangement of my quick attachable and detachable wheel means for a boat without departing from the real spirit and purpose of my invention, and it is my intention to cover by my claim, and modified forms of structure or use of mechanical equivalents which may be reasonably included within their scope.

I claim:

In combination with a boat having upper and lower portions, opposite sides and opposite ends, at least two spaced apart elongated plate members operatively detachably secured to one end of said boat adjacent its upper portion so that the longitudinal axes of said plate members be in a horizontal plane, an axle member rigidly and permanently secured to each of said plate members extending horizontally outwardly therefrom in opposite directions to each other, said axle members extending outwardly from said opposite sides of said boat, two clamping brackets secured to each of said plate members; each of said clamping brackets including a first vertical bracket member secured to said plate member extending upwardly therefrom which terminates in a horizontal bracket member extending inwardly therefrom with respect to said boat, said horizontal bracket member terminating in a second vertical bracket member extending downwardly therefrom along the interior surface of said one end of said boat; and a clamping bolt means threadably extending through said second vertical bracket member and having one end engaging the interior surface of said boat to maintain said plate members thereon at times, and each of said first and second vertical bracket members having a substantially greater horizontal length relative to the vertical length of said first and second vertical bracket members, and a wheel member rotatably secured to the outer end of each of said axle members.

References Cited by the Examiner

UNITED STATES PATENTS

| 2,624,591 | 1/1953 | Choplin | 280—47.13 |
| 2,916,747 | 12/1959 | Parrott | 9—1 |
| 3,101,203 | 8/1963 | Raymond | 280—47 |
| 3,159,410 | 12/1964 | Raymond. | |

BENJAMIN HERSH, *Primary Examiner.*

MILTON BUCHLER, *Examiner.*

J. A. PEKAR, *Assistant Examiner.*